United States Patent [19]
Davidson

[11] Patent Number: 4,536,689
[45] Date of Patent: Aug. 20, 1985

[54] SERVOMOTOR FEEDBACK FAULT DETECTOR

[75] Inventor: Dale D. Davidson, Glendale, Ariz.

[73] Assignee: Sperry Corporation, New York, N.Y.

[21] Appl. No.: 611,305

[22] Filed: May 17, 1984

[51] Int. Cl.³ .............................................. G05B 23/02
[52] U.S. Cl. .................... 318/565; 244/194
[58] Field of Search ............... 318/535, 565, 590, 580, 318/635; 244/194, 195

[56] References Cited

U.S. PATENT DOCUMENTS

| | | | |
|---|---|---|---|
| 3,199,013 | 8/1965 | Brahm et al. | 244/194 X |
| 3,935,523 | 1/1976 | Clevland | 318/635 |
| 4,092,716 | 5/1978 | Berg et al. | 318/580 |
| 4,094,481 | 6/1978 | DeWalt | 244/194 |
| 4,171,115 | 10/1979 | Osder | 318/565 X |
| 4,209,734 | 6/1980 | Osder | 318/565 X |

*Primary Examiner*—B. Dobeck
*Attorney, Agent, or Firm*—Howard P. Terry; Albert B. Cooper

[57] ABSTRACT

A servo motor feedback fault detector that combines the motor drive voltage, the current flowing through the motor and the rotational speed of the motor and compares this combined signal with a dynamic threshold generated by combining a percentage tolerance of the motor current with a percentage tolerance of the motor rotational rate.

9 Claims, 1 Drawing Figure

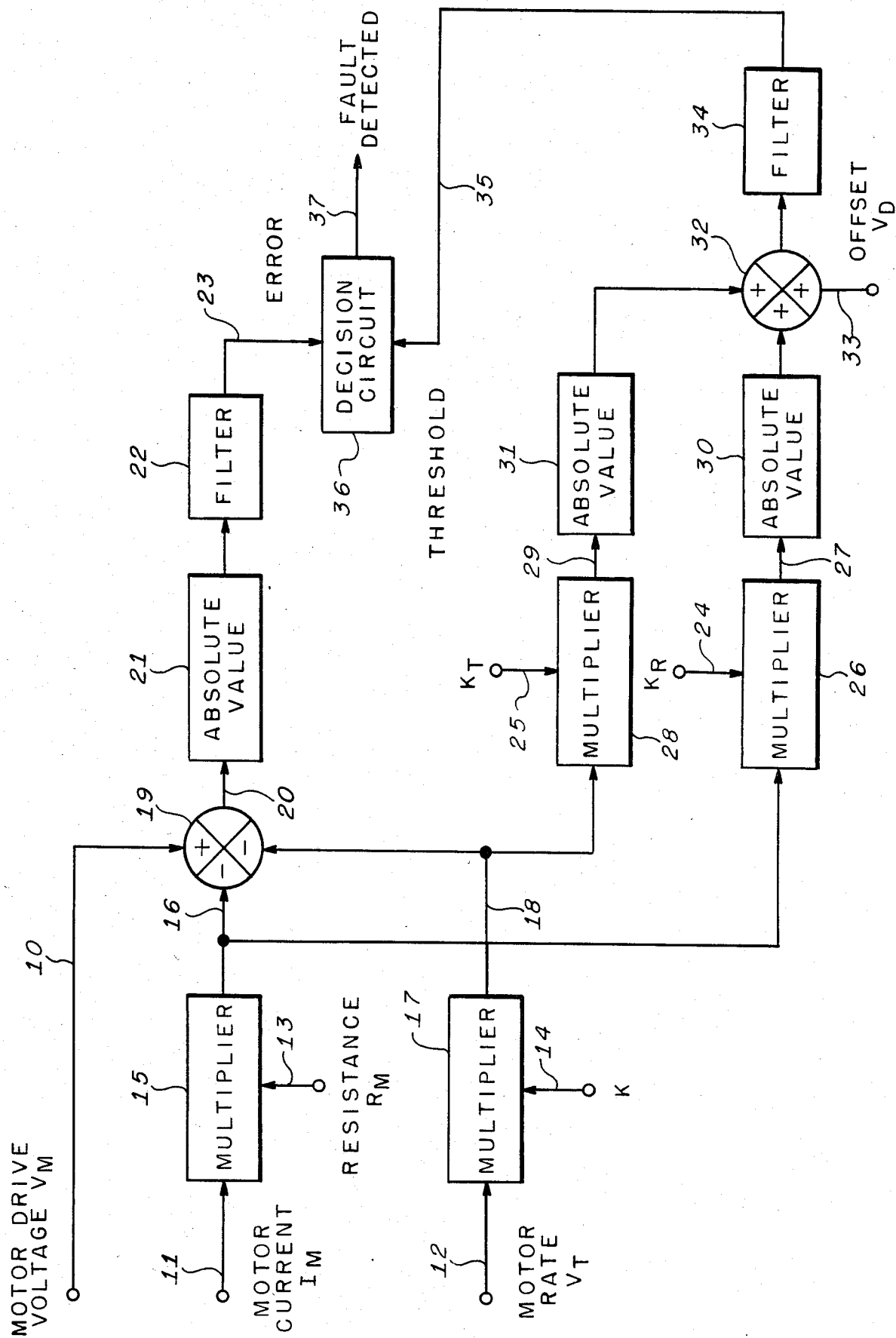

SERVOMOTOR FEEDBACK FAULT DETECTOR

BACKGROUND OF THE INVENTION

1. Field of the Invention

The invention relates to electric servomotors, particularly with respect to monitors therefor.

2. Description of the Prior Art

Servomotors are prevalent in various technologies for positioning output members in accordance with input command signals. Servomotors, for example, are utilized in automatic flight control systems for aircraft for positioning the aerodynamic control surfaces such as the ailerons, elevators and rudders as well as for positioning the engine throttles. Traditionally, feedback paths are utilized around such servomotors for providing, for example, motor damping. In a damping feedback loop, a tachometer generator coupled to the motor output shaft provides a feedback signal proportional to the rate of rotation of the motor. Since safety and reliability are of paramount importance in the design of automatic flight control systems, dangerous failures such as servomotor hardover or oscillatory conditions resulting from servo feedback faults must be obviated. In prior art, automatic flight control system servoes redundant feedback paths are utilized. In such configurations, dual tachometer generators are coupled to the servomotor output shaft with the rate feedback signals from the tachometers being combined for utilization as the servo feedback signal. Monitoring circuitry is included for comparing the outputs of the dual tachometers with facility for disabling the servo should a miscomparison occur.

It is a desideratum of automatic flight control system design to eliminate as many heavy, bulky and expensive components of the flight control system as practicable without reducing safety margins and reliability. The tachometer generator typically utilized in the servo motor feedback loops is such a component and elmination of the redundancy thereof is desirable.

SUMMARY OF THE INVENTION

The above-described disadvantages of the prior art are obviated by a servo motor feedback fault detector that combines the motor drive voltage with the current flowing through the motor as a result of applying the drive voltage thereto and with a tachometer signal proportional to the rate of rotation of the motor to provide a combined signal. A threshold signal is generated in accordance with the current flowing through the motor and the tachometer signal utilizing tolerance factors applied to these parameters. When the voltage, current and rate combination signal exceeds the threshold, a fault is indicated. Thus, servo motor and servo feedback faults are detected by monitoring the correlation between the measured motor parameters of motor drive voltage, motor current and motor rate.

BRIEF DESCRIPTION OF THE DRAWINGS

The sole FIGURE is a schematic block diagram of the servo motor feedback fault detector implemented in accordance with the invention.

DESCRIPTION OF THE PREFERRED EMBODIMENT

Servo motor parameters and feedback are related as follows:

$$V_M = (I_M)(R_M) + (K)(V_T) + (L_M)(dI_M/dt) \quad (1)$$

Where
$V_M$ = motor drive voltage
$I_M$ = motor current
$R_M$ = motor resistance
$V_T$ = motor tachometer voltage (rate)
$K$ = ratio between motor tachometer voltage and armature back EMF
$L_M$ = motor inductance
$dI_M/dt$ = first derivative of motor current.

The $(I_M)(R_M)$ term of the equation represents the motor heat loss due to the motor resistance and the resistance of the associated interconnecting wires. The $(K)(V_T)$ term represents the back EMF developed across the motor armature due to the motor rotation. This back EMF parameter is manifested by the voltage from a tachometer geared to the output shaft of the servo motor or included internally therewith. The ratio $(K)$ depends upon the configurations of the tachometer, of the motor and on the gearing therebetween. The tachometer output voltage is utilized to provide damping feedback around the servo motor in a conventional manner. The inductive term is the voltage developed across the motor inductance due to variations in motor current flow.

Equation 1 may be reduced to a steady state approximation by deleting the inductive term. This is permitted for monitoring since the L/R time constant in servo motors utilized in automatic flight control systems is typically small compared to the servo motor time constant represented by the tachometer term.

The servo motor and feedback parameters are combined for correlation in accordance with the invention as follows:

$$|V_M - (I_M)(R_M) - (K)(V_T)| < \text{Tolerance} \quad (2)$$

$$\text{Tolerance} = |(K_R)(I_M)| + |(K_T)(V_T)| + V_D \quad (3)$$

Where
$K_R$ = motor resistance tolerance (%)
$K_T$ = motor tachometer tolerance (%)
$V_D$ = measurement offset factor Referring to the sole FIGURE, the motor drive voltage $V_M$ is applied at a lead 10, the motor current $I_M$ is applied at a lead 11, the motor rate tachometer signal $V_T$ is applied at a lead 12, the motor resistance value $R_M$ is applied at a lead 13 and the tachometer voltage to armature back EMF ratio K is applied at a lead 14. The motor current $I_M$ on the lead 11 is multiplied at 15 by the resistance value $R_M$ on the lead 13 to form a product signal on a lead 16. The multiplier 15 forms the I R term of expression 2 above. The motor rate signal $V_T$ on the lead 12 is multiplied at 17 by the ratio K on the lead 14 to provide a product signal on a lead 18. The multiplier 17 forms the rate feedback term of expression 2 above.

The motor drive voltage $V_M$ on the lead 10 and the product signals on the leads 16 and 18 are algebraically summed at 19 to form a summation signal on a lead 20. The absolute value of the summation signal on the lead 20 is taken at 21 and the absolute value signal from the absolute value block 21 is filtered at 22 to provide a monitor error signal on a lead 23. The filter 22 is a low-pass filter implemented conventionally as a lag filter to smooth the signal from the block 21 and filter noise therefrom. In a sampled data implementation of the present invention, the filter 22 averages the signal from the block 21 over several samples. The absolute value taken at block 21 is provided to effectively rectify oscillatory error signals so as to provide a non-zero value therefor. If the absolute value were not taken, oscillitory error signals would average to zero through the filter 22 thereby not detecting the failure that caused the oscillitory error signal. The components 10–23 of the drawing implements the left-hand side of expression 2 above.

The motor resistance tolerance $K_R$ and the motor tachometer tolerance $K_T$ discussed above are applied at leads 24 and 25 respectively. The product signal on the lead 16 is multiplied at 26 by the motor resistance tolerance on the lead 24 to provide a product signal on a lead 27. The product signal on the lead 18 is multiplied at 28 by the motor tachometer tolerance signal on the lead 25 to form a product signal on a lead 29. The resistance tolerance $K_R$ is the total tolerance permitted in the motor resistance value to accommodate such factors as the resistance of the motor varying over temperature. The tachometer tolerance $K_T$ is the total permitted tolerance with respect to the ratio K resulting from such factors as variations in the ratio K due to geometrical anomalies of the motor and tachometer such as out-of-roundness of rotating elements and asymmetry in winding structures. Generally, the measured parameters themselves have tolerances associated therewith which are reflected in the tolerances $K_R$ and $K_T$.

The product signals on the leads 27 and 29 are applied to absolute value taking blocks 30 and 31 which provide the respective absolute values of the product signals on the leads 27 and 29. The algebraic sum of the signals from the absolute value blocks 30 and 31 are taken at 32. The algebraic sum provided at 32 includes a measurement offset factor $V_D$ applied at a lead 33. The offset factor $V_D$ compensates for offsets in the measurements provided in the system in which the invention is implemented. For example, in a digital sampled data embodiment of the invention, the factor $V_D$ compensates for offsets of the measurements associated with analog-to-digital and digital-to-analog converters, buffers, multiplexers, operational amplifiers and the like. The summation signal from the summing element 32 is passed through a low-pass filter 34 to provide a threshold signal on a lead 35. The absolute value blocks 30 and 31 and the filter 34 are implemented in a manner similar to and utilized for the reasons discussed above with respect to the absolute value block 21 and the filter 22. The components 24–35 embody expression 3 above.

It will be appreciated that the inputs to the multipliers 26 and 28 may alternatively be connected to the leads 11 and 12 respectively rather than connected as illustrated. In this alternative arrangement, the tolerance factors $K_R$ and $K_T$ will be adjusted to account for the resistance value $R_M$ and the tachometer ratio K respectively.

The error signal on the lead 23 and the threshold signal on the lead 35 are applied to a decision block 36 that compares the error signal with the threshold signal and provides a fault-detected signal on a lead 37 when the error signal exceeds the threshold. The fault-detected signal on the lead 37 may be utilized to set an appropriate failure flag or may be utilized to disable an autopilot servo or channel as required. The servo motor feedback fault detector of the present invention detects faults in the servo feedback that may precipitate such dangerous situations as autopilot hardovers and oscillitory conditions. The fault detector of the present invention also detects open circuit conditions with respect to the servo motor as well as latent faults in the monitored and measured data.

As is appreciated from the operation of servo motors, when a servo motor is free-running under the influence of the motor drive voltage, the tachometer signal is at a maximum, the back EMF developed across the armature is at a maximum, and hence the current flowing through the armature is at a minimum. As the motor load increases, the rate of rotation decreases along with a concomitant decrease in back EMF and increase in motor current. If the motor load should stall the motor, the tachometer voltage and back EMF drop to zero and the current flowing through the motor armature increases to a maximum.

Further, in accordance with the invention, the tolerance signal provided on the lead 36 dynamically adjusts the threshold for the decision circuit 36 in accordance with the dynamic conditions experienced by the servo motor. As appreciated for expression 3 above, when the servo motor is, for example, free-running (maximum $V_T$ and minimum $I_M$) the tolerance is provided primarily in accordance with the tachometer signal. Since traditionally the tolerance on the tachometer signal is approximately 10%, it is desired to tighten up the threshold on the lead 35 under such conditions so that the monitor will rapidly detect failures. Accordingly, an appropriate value for the tolerance factor $K_T$ is 12.5%. At the other extreme, when the servo motor is stalled, the tolerance of expression 3 is due primarily to the motor current. Since under these circumstances the motor resistance may vary over temperature by as much as 25%, it is desired to loosen up the threshold for the decision circuit 36 to minimize false-alarm failure detection. Accordingly, an appropriate value for the resistance tolerance $K_R$ is 37.5%. It is therefore appreciated that the monitor of the present invention is approximately three times more sensitive to failure indication when the servo motor is free-running than when the servo motor is stalled when utilizing these values for $K_R$ and $K_T$.

The present invention as described above and illustrated in the sole drawing may be implemented in hardware utilizing conventional analog circuits or conventional discrete digital circuits. The present invention may advantageously also be utilized in a digital sampled data system such as an automatic flight control system implemented with a digital computer. The motor drive voltage, motor current and motor rate signals may be applied to the input of the computer through appropriate conversion circuitry for processing within the computer in accordance with the functions described above to provide the fault-detected signal. The computer may also be utilized to close the feedback loop around the servo motor. For example, the tachometer signal applied to the computer input may be utilized by the computer in conjunction with external data for generating the positioning command to the servo motor.

While the invention has been described in its preferred embodiments, it is to be understood that the words which have been used are words of description rather than of limitation and that changes may be made within the purview of the appended claims without departing from the true scope and spirit of the invention in its broader aspects.

I claim:

1. A feedback fault detector for a servomotor, said motor being responsive to a drive voltage applied thereto and having an electrical resistance value associated therewith and having tachometer means coupled thereto for providing a tachometer signal proportional to the rate of rotation of said motor, comprising first combining means responsive to said drive voltage, to the current flowing through said motor as a result of said drive voltage applied thereto and to said tachometer signal for providing a combined signal in accordance with a linear combination thereof, second combining means responsive to said current and to said tachometer signal for providing a threshold signal in accordance with a linear combination thereof, and decision means responsive to said combined signal and to said threshold signal for providing a fault detected signal when said combined signal exceeds said threshold signal.

2. The detector of claim 1 in which said first combining means comprises first multiplying means responsive to said current and to said resistance value for providing a first product signal in accordance with the product therebetween, second multiplying means responsive to said tachometer signal and to a ratio signal proportional to the ratio between said tachometer signal and the voltage across the armature of said motor for providing a second product signal in accordance with the product therebetween, and first summing means responsive to said drive voltage, to said first product signal and to said second product signal for providing a first summation signal in accordance with the algebraic sum thereof.

3. The detector of claim 2 in which said first summing means comprises means for providing said first summation signal in accordance with $$V_M - (I_M)(R_M) - (K)(V_T)$$

where $V_M$ comprises said drive voltage,
$I_M$ comprises said current,
$R_M$ comprises said resistance value,
K comprises said ratio signal,
$V_T$ comprises said tachometer signal.

4. The detector of claim 2 in which said first combining means further includes first absolute value means responsive to said first summation signal for providing a first absolute value signal in accordance with the absolute value thereof.

5. The detector of claim 4 in which said first combining means further includes a lowpass filter responsive to said first absolute value signal for providing a filtered first absolute value signal, thereby providing said combined signal.

6. The detector of claim 1 in which said second combining means comprises third multiplying means responsive to said tachometer signal and to a tachometer tolerance signal for providing a third product signal in accordance with the product thereof, second absolute value means responsive to said third product signal for providing a second absolute value signal in accordance with the absolute value thereof, fourth multiplying means responsive to said current and to a resistance tolerance signal for providing a fourth product signal in accordance with the product thereof, third absolute value means responsive to said fourth product signal for providing a third absolute value signal in accordance with the absolute value thereof, and second summing means responsive to said first absolute value signal and to said second absolute value signal for providing a second summation signal in accordance with the algebraic sum thereof.

7. The detector of claim 6 in which said second summing means comprises means responsive to an offset factor signal for providing said second summation signal in accordance with the algebraic sum of said second absolute value signal, said third absolute value signal and said offset factor signal.

8. The detector of claim 7 in which said second summing means comprises means for providing said second summation signal in accordance with $$|(K_R)(I_M)| + |(K_T)(V_T)| + V_D$$

where $K_R$ comprises said resistance tolerance signal,
$I_M$ comprises said current,
$K_T$ comprises said tachometer tolerance signal,
$V_T$ comprises said tachometer signal,
$V_D$ comprises said offset factor signal.

9. The detector of claim 7 in which said second combining means further includes a lowpass filter responsive to said second summation signal for providing a filtered second summation signal thereby providing said threshold signal.

* * * * *